United States Patent [19]

Wolfe et al.

[11] 4,048,237

[45] Sept. 13, 1977

[54] PROCESS FOR THE DEALKYLATION OF T-BUTYL AND T-AMYL ETHERS ON POLYMERIC BACKBONES

[75] Inventors: David L. Wolfe; Arthur R. Sexton, both of Midland, Mich.

[73] Assignee: The Dow Chemical Company, Midland, Mich.

[21] Appl. No.: 589,643

[22] Filed: June 23, 1975

Related U.S. Application Data

[63] Continuation-in-part of Ser. No. 415,458, Nov. 12, 1973, abandoned.

[51] Int. Cl.² .................................................. C07C 41/00
[52] U.S. Cl. ........................... 260/615 B; 260/609 F; 260/611 B; 260/613 B
[58] Field of Search ............ 260/615 B, 611 B, 613 B, 260/609 F

[56] References Cited

U.S. PATENT DOCUMENTS 3,840,606   10/1974   Vanlerberghe .................. 260/615 B

FOREIGN PATENT DOCUMENTS 1,267,259   3/1972   United Kingdom ............ 260/615 B Primary Examiner—Howard T. Mars
Attorney, Agent, or Firm—David H. Fifield

[57] ABSTRACT

In a process for removing —R groups, where —R is tertiary butyl or tertiary amyl, from a polymer containing the monomeric unit represented by the formula

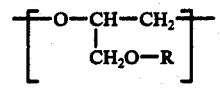

by contacting the polymer with a sulfonic acid, the improvement of contacting under essentially anhydrous conditions.

12 Claims, No Drawings

PROCESS FOR THE DEALKYLATION OF T-BUTYL AND T-AMYL ETHERS ON POLYMERIC BACKBONES

CROSS REFERENCE TO RELATED APPLICATION

This application is a continuation-in-part of our co-pending application, Ser. No. 415,458 filed Nov. 12, 1973, now abandoned.

BACKGROUND OF THE INVENTION

The invention relates to an improved process for removing tertiary butyl or tertiary amyl groups from the pendant tertiary butyl or tertiary amyl ether groups of oxyalkylene homopolymers and copolymers.

Vanlerberghe, in British Pat. No. 1,267,259 (1972), describes the preparation of polyhydroxylated polymers having polyoxyalkylene backbones by removing tertiary butyl groups from polytertiary butoxylated polyoxyalkylene backbones. He teaches that this dealkylation is best accomplished by contacting the starting material with a catalytic amount of a sulfonic acid and about 10 to about 200 percent water, based on the weight of the polymeric starting material.

Kwantes et al., in British Pat. No. 1,165,479 (1969), describe the decomposition of an aliphatic tertiary ether into a tertiary monoolefin and an alcohol by contacting the ether with a high surface aluminum catalyst, preferably containing sulfate groups in the presence of steam where the steam to ether molar ratio is 1:1 or higher.

Watanabe et. al., U.S. Pat. No. 3,637,889 (1972), describe the decomposition of a tertiary butyl alkyl ether into isobutylene and an alkanol by contacting the ether with a metal sulfate catalyst. However, they teach that contacting a primary alcohol with a tertiary olefin in the presence of acid catalysts, such as organic sulfonic acid catalysts, results in the formation of a tertiary ether.

SUMMARY OF THE INVENTION

Disclosed is an improved process for removing at least one —R group, where —R is tertiary butyl or tertiary amyl, from a polymer comprising one or more units represented by the formula

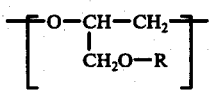 (I)

by contacting the polymer with a sulfonic acid, wherein the improvement comprises contacting the polymer with the sulfonic acid under essentially anhydrous conditions. In a preferred embodiment of the invention, a homopolymer of (I) and isothionic acid, wherein the weight of the isothionic acid is about 1% of the weight of the homopolymer, are contacted in the liquid phase at about 130° to about 140° C. for about 0.25 hour. The resulting polyhydroxylated polymeric product is useful as a reactant with a polyisocyanate to make a polyurethane resin useful in coatings and shaped objects.

DETAILED DESCRIPTION OF THE INVENTION

POLYMERS

The polymers from which at least one tertiary —R group will be removed comprise one or more units represented by the formula of (I). These polymers may be homopolymers or copolymers of (I) and may be obtained by homopolymerizing t-butyl or t-amyl glycidyl ether or by copolymerizing either glycidyl ether with other monomers containing an oxirane functional group. Suitable comonomers containing oxirane functionality are those such as ethylene oxide, propylene oxide, 1,2-butylene oxide, 2,3-butylene oxide, 1,2-epoxy hexane, styrene oxide, glycidol, epihalohydrins and the like or mixtures thereof.

The polymerization of materials containing oxirane functional groups is well known in the art and is generally carried out by contacting the monomers with a catalyst such as Lewis Acid, for example, $Df_3$ and the like, or a base, such as an alkali metal hydroxide or tertiary amine. A suitable chain initiating agent, such as an aliphatic alcohol, polyol, phenol, thiol or polythiol, water or another material having active hydrogen groups thereon may be used to obtain polymers having the molecular weight and structure desired.

SULFONIC ACIDS

Tertiary —R groups are removed from the polymers described above by contacting the polymers with a sulfonic acid. The sulfonic acids suitable for use in the invention are aliphatic sulfonic acids such as sulfonated fatty acid esters, sulfonated fatty alcohols and ethers derived therefrom, sulfonated straight and branched alkanes, and, when some esterification of the end product is not detrimental, sulfonated fatty acids; aromatic sulfonic acids, especially those having a benzene or napthalene base; sulfonated poly(vinylaromatic) resins; and the like.

Examples of some sulfonic acids which may be utilized in the invention are para-toluenesulfonic acid, hereinafter PTSA; benzenesulfonic acid; isethionic acid (2-hydroxyethanesulfonic acid); sulfonated castor oil; sulfonated tall oil; sulfonated dodecane; sulfonated butyl stearate; sulfonated lauryl alcohol; and sulfonated styrene-divinylbenzene copolymer beads. Preferred for use in the invention are PTSA and isethionic acid.

The sulfonic acid and the polymer are suitably contacted in quantities wherein the weight of the sulfonic acid is about 0.01% to about 20% of the weight of the polymer. Preferably, the weight of the sulfonic acid is about 0.05% to about 5% and most preferably about 0.1% to about 1% of the weight of the polymer employed. Quantities as high as 100-200% may be used but economics naturally favor the utilization of smaller amounts.

PROCESS CONDITIONS

Polymers comprising (I), where —R was t-butyl, have previously been contacted with sulfonic acids; however, the prior processes were carried out in the presence of about 8.5% or more water based on the weight of polymer contacted (Vanlerberghe's British patent). In fact, Vanlerberghe teaches that the presence of water is necessary to bring about the "heterolysis" of tertiary butoxy groups on the polymer. We have found, however, that by contacting the sulfonic acid and the polymer under essentially anhydrous conditions, quantitative yields of polymer having the tertiary —R groups removed may be obtained. Moreover, this dealkylation process is carried out more rapidly under essentially anhydrous conditions and at elevated temperatures above about 130° C.

Although it is usually desirable to remove essentially all of the tertiary —R groups in the polymers, it is feasible to monitor the process by the amount of isobutylene or 2-methylbutenes evolved and to stop the reaction at any desired point by cooling the reaction mixture and separating the sulfonic acid therefrom.

As used herein, the term "essentially anhydrous" means that the amount of water present in the reaction mixture is less than about 8%, preferably less than about 7%, more preferably less than about 4%, even more preferably less than about 2% and most preferably less than about 1%, based on the weight of the polymer.

The polymer and the chosen sulfonic acid may be contacted in any suitable vessel but since it is normally desirable to recover the gaseous isobutylene or 2-methylbutene by-products of the reaction, they are most suitably contacted in an enclosed vessel from which the by-product may be withdrawn. Preferably, polymer and sulfonic acid are contacted with both being in the liquid phase.

The polymer and sulfonic acid are suitably contacted at a temperature above about 90° C. The reaction above about 100° C proceeds more rapidly and a temperature of about 130° to about 160° C is preferred. A temperature above 160° C may be used if the product is not excessively degraded thereby. The most suitable reaction temperature depends on the molecular weight of the polymer; when polymers of molecular weights less than about 20,000 are employed, temperatures of about 130° to about 140° C are preferred and when polymers of greater than 20,000 molecular weights are employed, temperatures of about 140° to about 160° C are preferred.

If the polymer to be dealkylated is of such molecular weight that it exists as a solid, wax or very viscous liquid under reaction conditions, it may be dissolved in a suitable anhydrous solvent such as benzene, toluene, ethylbenzene, chlorobenzenes and the like, in order that the polymer may be maintained in the liquid phase. When employing a solvent, the reaction is preferably carried out under reflux conditions.

The polymer and the sulfonic acid are suitably contacted until the reaction is complete, usually about 0.25 to about 3 hours. Since as the reaction proceeds isobutylene, 2-methylbutene or 2-methylbutene-2 is produced, the completion of the reaction is easily determined; the by-product gas will cease to be evolved when the reaction has gone to completion.

In one preferred embodiment of the invention, the evolution of the gaseous by-product is encouraged by bubbling an inert gas, such as nitrogen, argon, and the like, through the reaction mixture which is in the liquid phase. In another preferred embodiment, the polymer and sulfonic acid are contacted under subatmospheric pressure. This also promotes the evolution of the by-product and drives the reaction to completion. In another preferred embodiment, both polymer and acid are in the liquid phase.

The dealkylated polymer product comprising units of (II) is suitably recovered and separated from the sulfonic acid by neutralizing the acid and filtering the resulting salt from the product mixture. Water is removed by any convenient means, such as by azeotroping with benzene and then benzene and any solvent are removed by further heating. Since the by-products are gaseous materials under the reaction conditions, they will naturally separate from the liquid phase reaction mixture and may be recovered or disposed of as desired.

SPECIFIC EMBODIMENTS OF THE INVENTION

EXAMPLE 1

Homopolymers of about 370 and 410 weight average molecular weights were prepared by contacting t-butyl glycidyl ether with a boron trifluoride etherate in the presence of a bit of water as an initiator. Samples of these polymers, liquids at room temperature, were dissolved in excess monochlorobenzene solvent and contacted with the designated sulfonic acid in a 250 ml. three-necked flask equipped with reflux condenser and stirrer. The mixture was then heated to reflux and maintained at about reflux temperature for the course of the reaction.

Isobutylene was observed to be liberated and the progress of the reaction was followed by observing the evolution of this gas. When the evolution had ceased and the mixture allowed to cool, a base was added to the reaction mixture to neutralize the sulfonic acid and the salt formed was removed by filtration. The filtrate was then azeotroped with benzene to drive off any water present and then heated further to drive off excess benzene and any solvent.

The final products were analyzed for infrared spectroscopy (hereinafter IR) for the presence of tertiary-butyl groups and by nuclear magnetic resonance spectroscopy (hereinafter NMR).

Run 1. Para-Toluene Sulfonic Acid

The homopolymer of about 410 molecular weight was contacted with about 1% of its weight of PTSA. The total water present in the reaction mixture was about 0.1% of the weight of the homopolymer reactant. The reaction temperature was about 110° to about 130° C. with the temperature initially dropping when isobutylene began to evolve and rising when dealkylation was nearly complete. IR and NMR analysis showed essentially complete dealkylation after the reaction had proceeded for about 90 minutes, as evidenced by lack of t.-butyl bands in the spectra.

Run 2. Isethionic Acid

The homopolymer of about 370 molecular weight was contacted with about 5% of its weight of isethionic acid (78% aqueous solution). The total water present in the reaction mixture was about 1.4% of the weight of the homopolymer reactant. The mixture was heated to about 100° C. whereupon vigorous evolution of isobutylene was observed, dropping the temperature to about 90° C. After about 15 minutes, the temperature rose to about 110° C. Product recovered was essentially free of t.-butyl groups as demonstrated by NMR analysis.

The product obtained with isethionic acid was found to have fewer degradation products, as evidenced by the lighter color of the product. The product may be purified by passing it over a bed of activated carbon, if desired.

EXAMPLE 2

The following runs were made for comparison with the Vanlerberghe teachings in British Pat. No. 1,267,259. The runs were made using a homopolymer of t-butyl glycidyl ether of about 1000 weight average molecular weight which was prepared in the manner of Example 1. In each run, 150 g of the homopolymer was heated to about 100° C and contacted with about 1% of its weight of isethionic acid (1.997 g of a 75% aqueous solution) maintaining the 100° C temperature (± 5° C) in a 250 ml flask equipped with a reflux condenser, stirrer and dropping funnel. Water was then added dropwise, as Vanlerberghe states is necessary to avoid phase separation, until the stated weight percentage of water had been reached. The isethionic acid contained about 25% water as received and this water is included in the weight percentages of water stated. In Run 7, sufficient water was added to approximate the 8.5% water present in Vanlerberghe's Example 9B, page 7 of the British patent.

In Runs 3 through 6, the same reaction conditions were maintained except that the amount of water added was varied. In Run 8, under essentially anhydrous conditions, the temperature of the reaction mixture was raised to about 130°–140° C, which shows the beneficial effects of elevated temperature.

All runs except Run 8 were carried out by heating at 100° C. for 105 minutes, the time required for complete dealkylation in Run 3 at essentially anhydrous conditions, then removing the heat source. Percent dealkylation was determined by NMR analysis of samples of the final product relative to NMR of the original t.-butyl glycidyl ether homopolymer.

and 18 g. more of isobutylene were recovered in 1 hour, a 99% dealkylation based on the 2.25 moles of t-butyl glycidyl ether originally polymerized.

We claim:

1. In a process for removing at least one —R where —R is tertiary butyl or tertiary amyl from a polymer comprising one or more units represented by the formula

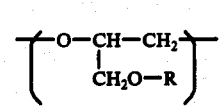     (I)

by contacting at above about 90° C the polymer, which is in the liquid phase, with a sulfonic acid, the improvement comprising contacting the polymer with the sulfonic acid under essentially anhydrous conditions of less than about 7 percent water based on the weight of the polymer.

2. The process of claim 1 wherein the weight of water present is less than about 2%.

3. The process of claim 1 wherein the sulfonic acid and the polymer are contacted at a temperature of about

TABLE

Comparative Dealkylations, Varied Water Content
PSTA and Isenthionic Acid

| | Run No. | Water Present (total) Wt. %* | Percent t.-Butyl Groups Removed** | Comments |
|---|---|---|---|---|
| Example 1 | 1 | 0.1 | 99+ | 1% PTSA for ~90 min. at ~110° – 130° C. |
| | 2 | 1.4 | 99+ | 5% isethionic acid for ~15 – 30 min. at ~90° - 110° C. |
| | 3 | 0.33 | 99+ | Dealkylation with 1% isenthionic acid at ~100° C. for 105 minutes. |
| Example 2 | 4 | 2.0 | 25.6 | " |
| | 5 | 4.0 | 19.0 | " |
| | 6 | 7.0 | 16.0 | " |
| | 7 | 8.5 | 3.1 | " |
| | 8 | 0.33 | 99+ | Dealkylation at ~130° – 140° C. complete** in 15 min. |

*Based on weight of polymer reactant charged.
**As determined by NMR analysis.

EXAMPLE 3. DEALKYLATION OF COPOLYMER

A random copolymer was prepared by reacting 2707 g. of propylene oxide and 293 g. of t-butyl glycidyl ether using a basic tripropylene glycol initiating agent. The copolymer product had about a 3300 weight average molecular weight, of which about 9% by weight was composed of

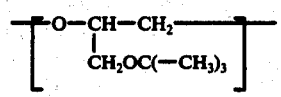

monomeric units.

The polymeric product was dealkylated by contacting with 66.3 g. of isethionic acid (as a 78% aqueous solution) of which 32.4 g. were required to neutralize basic sodium from the initiating agent. The 33.9 g. of acid available for dealkylation were 1% based on the total weight of the polymer. There were 18.7 g. of water present in the polymer which was contacted with the acid or about 0.57% based on the total weight of the polymer.

The polymer and isethionic acid were contacted for about 2 hours at 125°–127° C. during which time 107 g. of isobutylene (85% of theory) were recovered in a Dry Ice Trap. The temperature was then raised to 140° C.

90° to about 160° C.

4. The process of claim 1 wherein the sulfonic acid and the polymer are contacted at a temperature of about 130° to about 160° C.

5. The process of claim 1 wherein the sulfonic acid is para-toluenesulfonic acid.

6. The process of claim 1 wherein the sulfonic acid is isethionic acid.

7. The process of claim 1 wherein the polymer is a homopolymer comprising the repeating unit (I) where —R is a tertiary butyl group.

8. The process of claim 1 wherein the polymer is a copolymer comprising the repeating unit (I) where —R is a tertiary butyl group.

9. The process of claim 1 wherein —R is a tertiary butyl group and the polymer has a molecular weight less than about 20,000.

10. The process of claim 9 wherein the acid is isethionic acid and the weight of isethionic acid is about 1% of the weight of the polymer, the polymer and isethionic acid are contacted at about 130°–140° C and the weight of water present is less than about 1% based on the weight of the polymer.

11. The process of claim 1 wherein the temperature is above about 100° C.

12. The process of claim 1 wherein both the polymer and the sulfonic acid are in the liquid phase.

* * * * *

UNITED STATES PATENT AND TRADEMARK OFFICE
CERTIFICATE OF CORRECTION

PATENT NO. : 4,048,237

DATED : September 13, 1977

INVENTOR(S) : David L. Wolfe; Arthur R. Sexton

It is certified that error appears in the above-identified patent and that said Letters Patent are hereby corrected as shown below:

Col. 1, line 54, delete "isothionic" and insert --isethionic--.

Col. 1, line 55, delete "isothionic" and insert --isethionic--.

Col. 2, line 13, after "as" and before "Lewis" insert --a--.

Col. 2, line 13, delete "$Df_3$" and insert --$BF_3$--.

Col. 4, line 25, delete "for" and insert --by--.

Col. 5, in the TABLE, second line of first heading, delete "PSTA" and insert --PTSA--.

Col. 5, in the TABLE, second line of first heading, delete "Isenthionic" and insert --Isethionic--.

Col. 5, in the TABLE, under heading "Comments", third comment, second line, delete "isenthionic" and insert --isethionic--.

Col. 6, line 5, insert --group-- after "-R".

Signed and Sealed this

Fourteenth Day of February 1978

[SEAL]

Attest:

RUTH C. MASON
Attesting Officer

LUTRELLE F. PARKER
Acting Commissioner of Patents and Trademarks